United States Patent
Hasegawa et al.

(10) Patent No.: US 7,574,364 B2
(45) Date of Patent: Aug. 11, 2009

(54) CONTENTS RATING METHOD

(75) Inventors: Yutaka Hasegawa, Hamamatsu (JP);
Shinji Koezuka, Hamamatsu (JP);
Nobuo Tsunashima, Hamamatsu (JP);
Masaya Okura, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 932 days.

(21) Appl. No.: 09/953,518

(22) Filed: Sep. 12, 2001

(65) Prior Publication Data
US 2002/0032776 A1 Mar. 14, 2002

(30) Foreign Application Priority Data
Sep. 13, 2000 (JP) .............................. 2000-278800

(51) Int. Cl.
*G06Q 10/00* (2006.01)
(52) U.S. Cl. ......................................................... 705/1
(58) Field of Classification Search ................. 709/203, 709/202, 217, 218, 219, 224, 225, 213; 704/260; 382/181; 705/1
See application file for complete search history.

(56) References Cited

U.S. PATENT DOCUMENTS

| | | | | |
|---|---|---|---|---|
| 4,764,120 A * | 8/1988 | Griffin et al. | ................. | 434/336 |
| 5,884,282 A * | 3/1999 | Robinson | ...................... | 705/27 |
| 6,041,311 A * | 3/2000 | Chislenko et al. | ............. | 705/27 |
| 6,064,980 A * | 5/2000 | Jacobi et al. | ................... | 705/26 |
| 6,175,833 B1 * | 1/2001 | West et al. | ................... | 707/102 |
| 6,195,655 B1 * | 2/2001 | Lawler | .......................... | 707/4 |
| 6,389,469 B1 * | 5/2002 | Vekslar et al. | .............. | 709/226 |
| 6,438,579 B1 * | 8/2002 | Hosken | ....................... | 709/203 |
| 6,769,010 B1 * | 7/2004 | Knapp et al. | ................ | 709/203 |
| 6,819,797 B1 * | 11/2004 | Smith et al. | .................. | 382/181 |
| 6,957,383 B1 * | 10/2005 | Smith | ...................... | 715/501.1 |
| 7,103,642 B1 * | 9/2006 | Chen et al. | .................. | 709/218 |
| 7,159,178 B2 * | 1/2007 | Vogt et al. | .................. | 715/733 |

(Continued)

OTHER PUBLICATIONS

Konstan et al. "GroupLens: Applying Collaborative Filtering to Usenet News". Communications of the ACM, vol. 40, No. 3: Mar. 1997. pp. 77-87.*
Shardanand, Upendra. "Social Information Filtering for Music Recommendation". Massachusetts Institute of Technology, Sep. 1994. pp. 1-93.*

(Continued)

*Primary Examiner*—Andrew Caldwell
*Assistant Examiner*—Christopher Biagini
(74) *Attorney, Agent, or Firm*—Morrison & Foerster LLP

(57) ABSTRACT

A method is designed for evaluating contents provided in the form of a plurality of works from a server apparatus having a storage unit that stores a frequency of evaluation counted for each work, and a communication unit that communicates with a terminal apparatus where the evaluation of works is conducted. The method is carried out by the steps of receiving a request for a list of works to be evaluated from the terminal apparatus, determining an order of the works in the list according to the frequency of evaluation for each work, transmitting the list of the works arranged in the determined order to the terminal apparatus, thereby prompting the evaluation of the works in the list, and receiving a result of the evaluation from the terminal apparatus and updating the frequency of the evaluation for each work according to the result of the evaluation. Alternatively, the order of works to be presented to the terminal apparatus for the evaluation is determined according to a random number, thereby randomizing the order of the works.

8 Claims, 8 Drawing Sheets

U.S. PATENT DOCUMENTS

2001/0049732 A1* 12/2001 Raciborski et al. .......... 709/224
2002/0120619 A1* 8/2002 Marso et al. ................... 707/3
2002/0165905 A1* 11/2002 Wilson ....................... 709/203
2003/0028378 A1* 2/2003 August et al. ............... 704/260

OTHER PUBLICATIONS

"New Audition Venue Combines the Power of the Internet with Live Performance—'Open Mike on the Internet'". Yamaha Corporation, Apr. 18, 2000. pp. 1-5.*

* cited by examiner

FIG.2 (A)

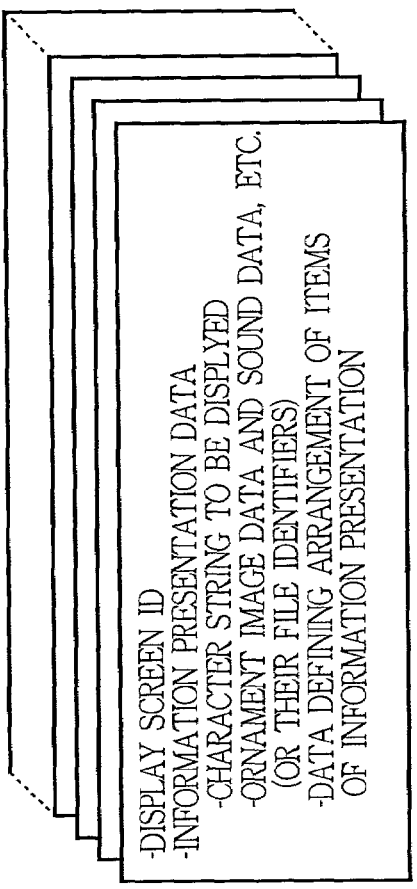

- WORK ID
- WORK DATA
- MIDI DATA, SOUND DATA, ETC.
- IMAGE (INCLUDING MOVING IMAGE) DATA, ETC.
- TEXT DATA, ETC.
- PROGRAM (INCLUDING APPLET)

LIST DATA OF WORKS

FIG.2 (B)

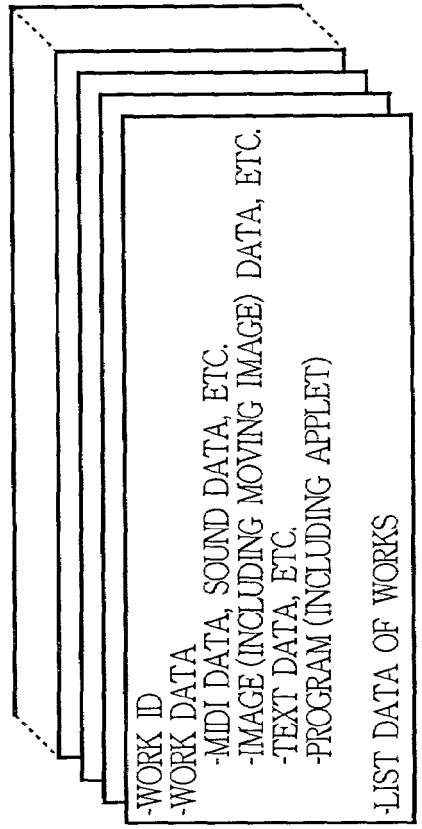

- DISPLAY SCREEN ID
- INFORMATION PRESENTATION DATA
- CHARACTER STRING TO BE DISPLAYED
- ORNAMENT IMAGE DATA AND SOUND DATA, ETC. (OR THEIR FILE IDENTIFIERS)
- DATA DEFINING ARRANGEMENT OF ITEMS OF INFORMATION PRESENTATION

FIG.2 (C)

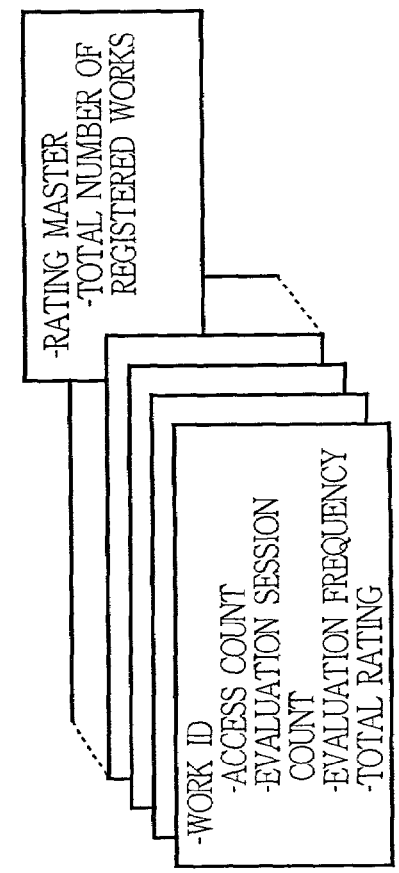

- RATING MASTER
- TOTAL NUMBER OF REGISTERED WORKS

- WORK ID
- ACCESS COUNT
- EVALUATION SESSION COUNT
- EVALUATION FREQUENCY
- TOTAL RATING

FIG.2 (D)

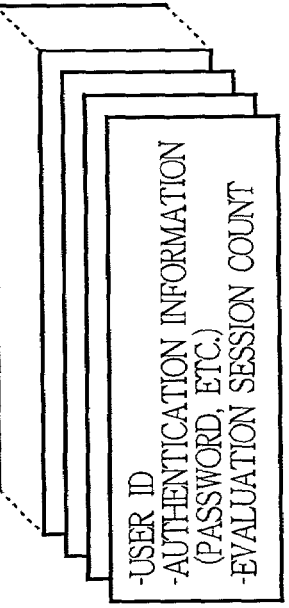

- USER ID
- AUTHENTICATION INFORMATION (PASSWORD, ETC.)
- EVALUATION SESSION COUNT

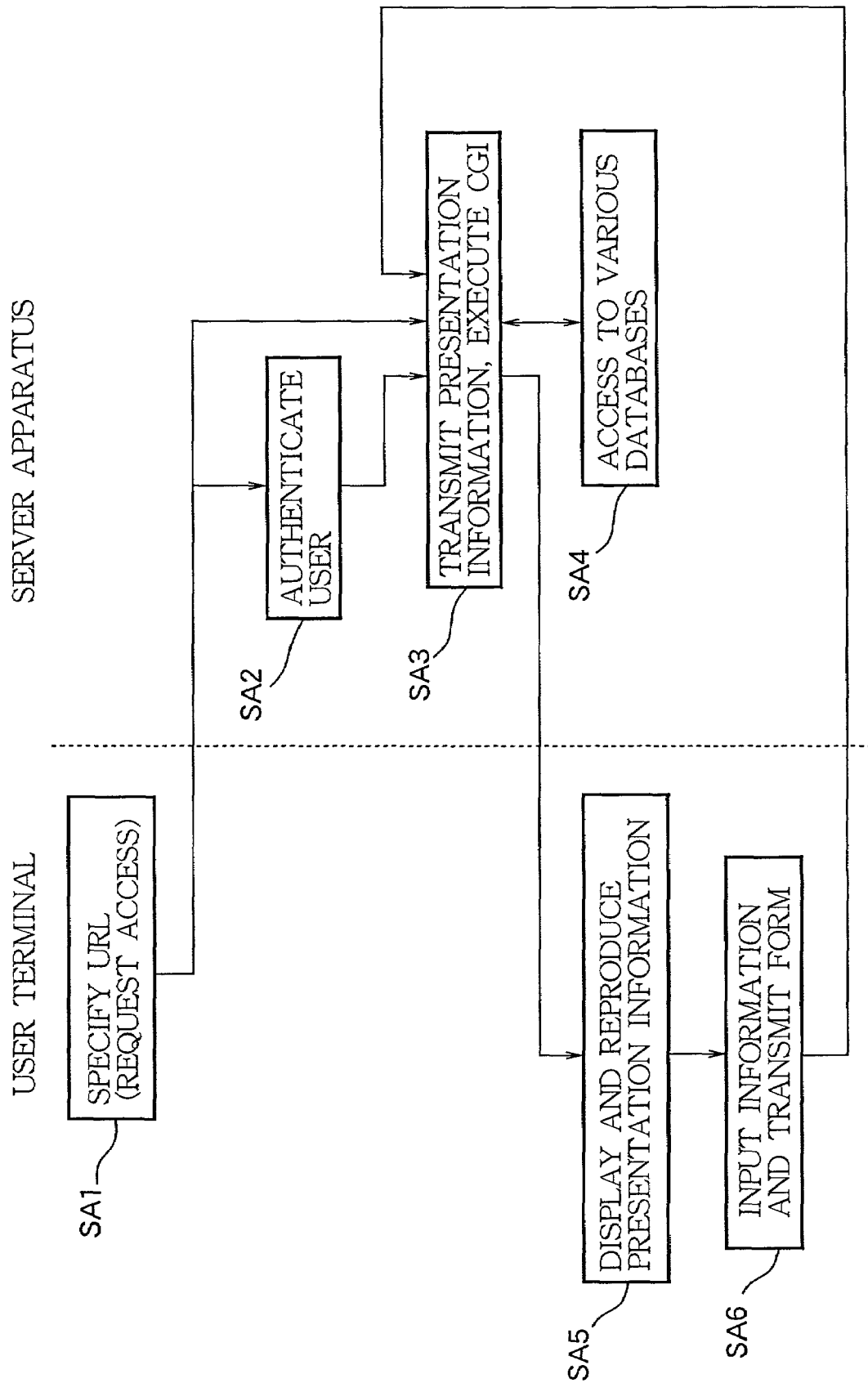

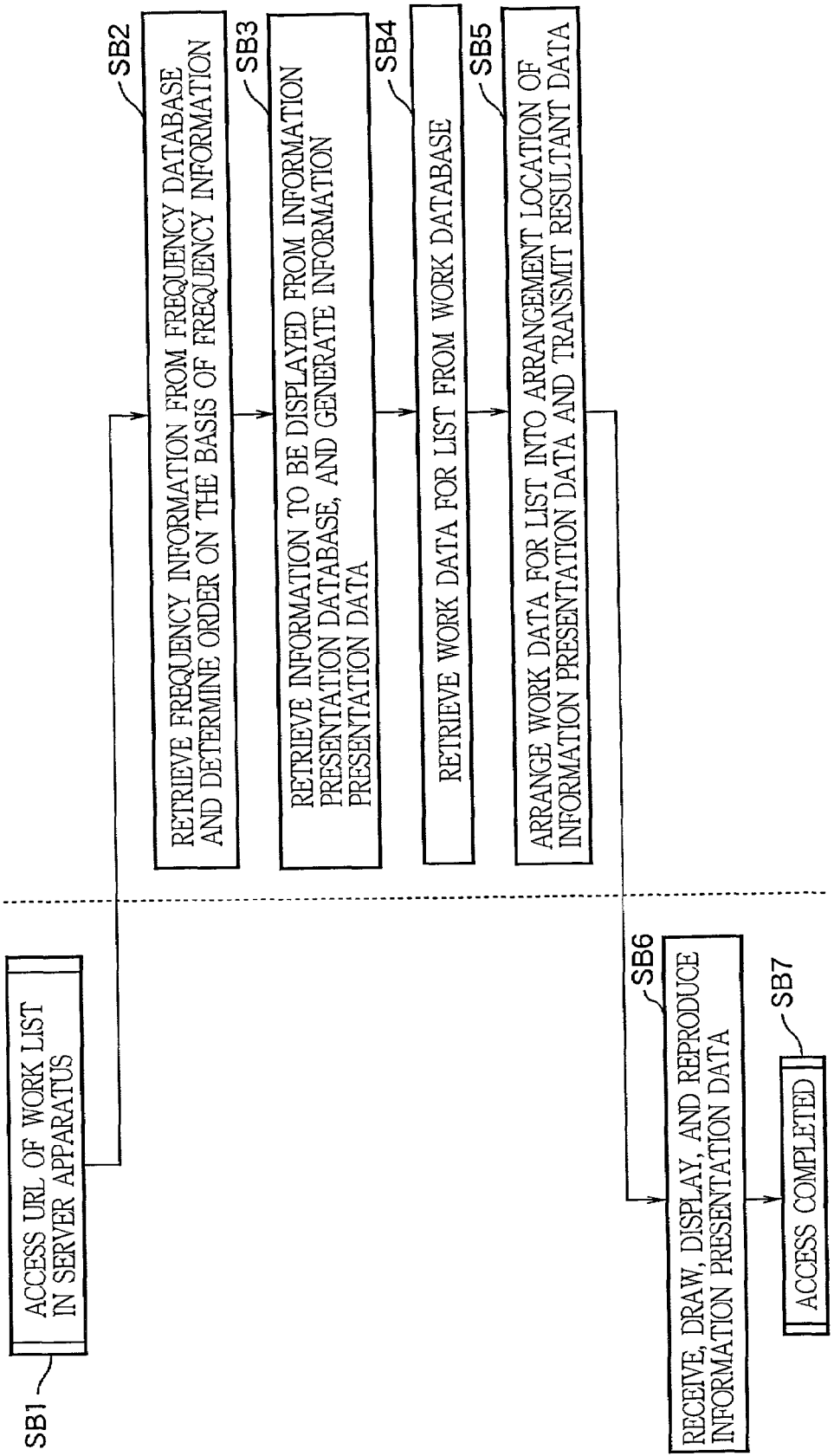

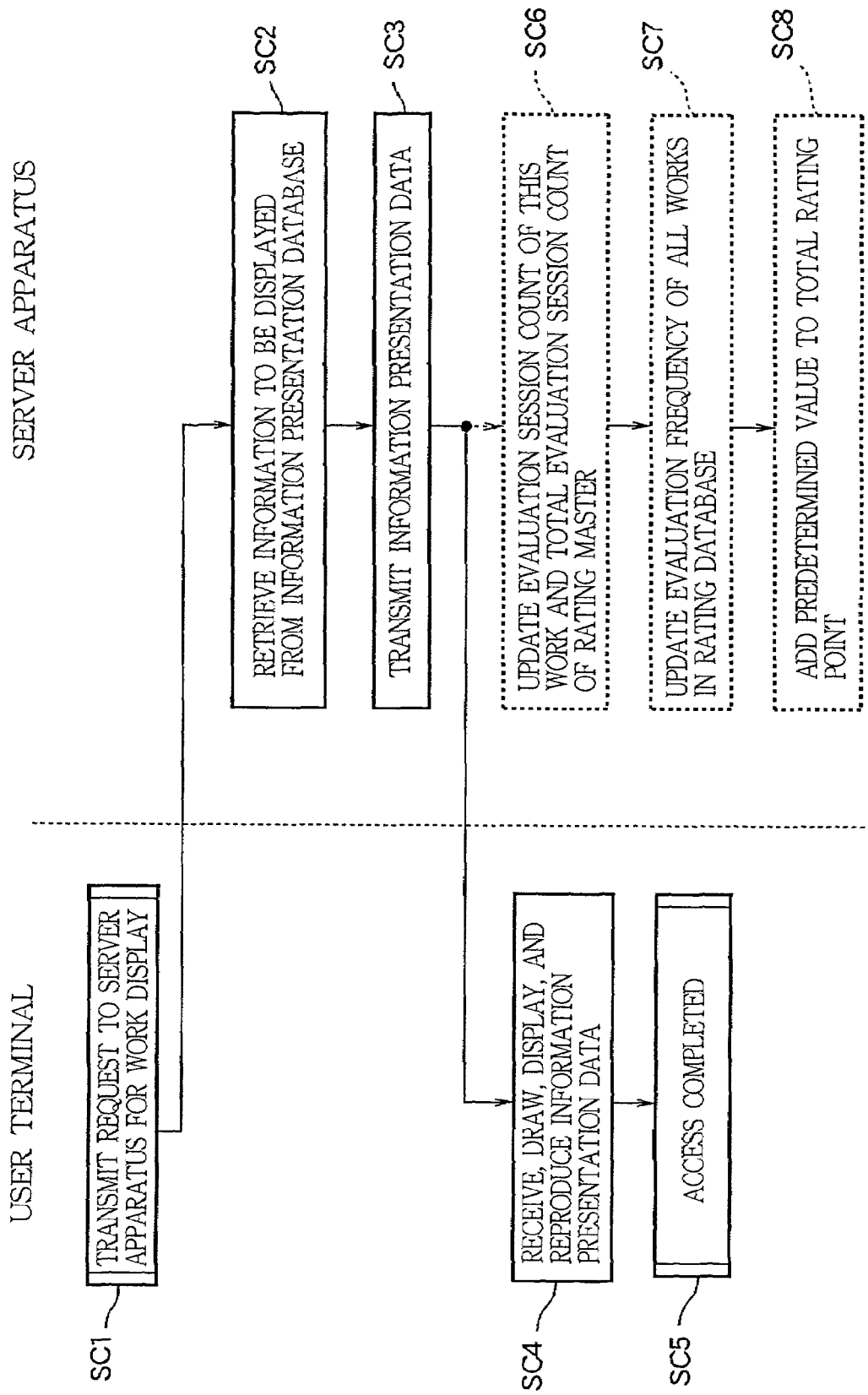

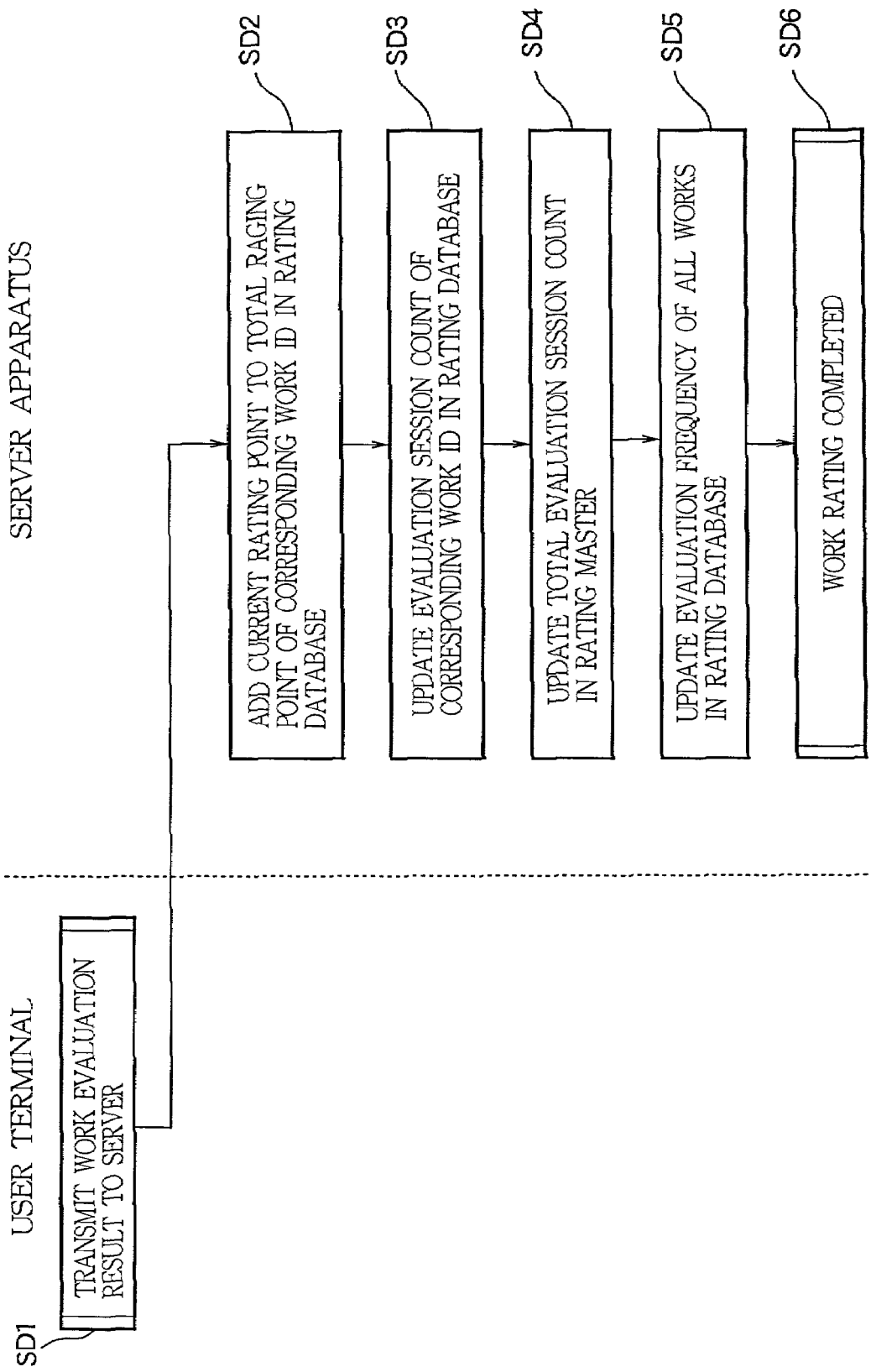

CONTENTS RATING METHOD

BACKGROUND OF THE INVENTION

1. Field of the Invention

The present invention relates generally to a contents rating method for rating a plurality of content items (for example, music pieces, still pictures, moving pictures, literature texts, and computer programs) by evaluators in a public review, popularity poll, public audition, and the like by use of computer networks or public switched phone lines.

2. Description of Related Art

Today, the public rating of contents is popularly practiced by use of computer networks or public switched phone lines. In the contents rating, a list of works or works themselves to be rated are presented to their evaluators from a server via a computer network or a public switched phone line. Each evaluator references the presented list to select particular works and listen to, view, or read the selected works for rating. The evaluators send their rating results to the server via the computer network or the public switched phone line. The server compiles the collected rating results and performs an overall rating on each of the rated works.

The lists of works or works themselves under rating are presented in a fixed order of their application numbers or titles for example. Therefore, if all evaluators rate all works, weights of the ratings are impartial to one another.

However, in a public review, a popularity poll, or a public audition, it is seldom for all evaluators to evenly rate all the presented works. Often, many evaluators tend to evaluate only the works which appear at the beginning of the list, then quitting the rating on the remaining part of the list. This tendency gets stronger as the number of works under rating increases.

As described, the above-mentioned related-art technique of rating works presents (or displays) them in a fixed order of their application numbers or titles for example, so that the works presented at the end of a list are rated less frequently than those presented at the head of the list, resulting in a lower reliability of overall rating, which is not attributable to the works themselves.

SUMMARY OF THE INVENTION

It is therefore an object of the present invention to provide a contents rating method for impartially rating contents such as music pictures, still pictures, moving pictures, literature texts, and computer programs in a publicly presented state via a computer network or a public switched phone line.

The present invention is characterized mainly by dynamically determining the ordering of works for presentation in a content list and prompting the evaluators to rate each work in the dynamically determined ordering of works, thereby providing a contents rating technique which is generally impartial in evaluation frequency.

In one aspect of the invention, a method is designed for evaluating contents provided in the form of a plurality of works from a server apparatus having a storage unit that stores a frequency of evaluation counted for each work, and a communication unit that communicates with a terminal apparatus where the evaluation of works is conducted. The inventive method comprises the steps of receiving a request for a list of works to be evaluated from the terminal apparatus, determining an order of the works in the list according to the frequency of evaluation for each work, transmitting the list of the works arranged in the determined order to the terminal apparatus, thereby prompting the evaluation of the works in the list, and receiving a result of the evaluation from the terminal apparatus and updating the frequency of the evaluation for each work according to the result of the evaluation.

Preferably, the step of determining the order of the works is carried out when a request for the list of the works is received by the server apparatus. Alternately, the step of determining the order of the works is carried out after previous result of the evaluation is received by the server apparatus. Preferably, the inventive method further comprises the step of counting a predetermined period by means of a timer provided in the server apparatus, so that the step of determining the order of the works is carried out each time the predetermined period is counted. Specifically, the inventive method further comprises the step of providing the contents in the form of works selected from a group consisting of music works, graphic art works, movie works, literary works and computer program works.

In another aspect of the invention, a method is designed for controlling evaluation of contents provided in the form of a plurality of works by a server apparatus having a capability of communicating with a terminal apparatus at which the evaluation of the works is performed. The inventive method comprises the steps of generating a random number, determining an order of works to be presented to the terminal apparatus for the evaluation according to the random number, thereby randomizing the order of the works, transmitting a list of the works arranged according to the randomized order to the terminal apparatus, thereby prompting the evaluation of the works presented in the list, and receiving a result of the evaluation from the terminal apparatus.

Preferably, the step of determining the order of the works is carried out when a request for the list of the works is received by the server apparatus. Alternately, the step of determining the order of the works is carried out after previous result of the evaluation is received by the server apparatus. Preferably, the inventive method further comprises the step of counting a predetermined period by means of a timer provided in the server apparatus, so that the step of determining the order of the works is carried out each time the predetermined period is counted. Specifically, the inventive method further comprises the step of providing the contents in the form of works selected from a group consisting of music works, graphic art works, movie works, literary works and computer program works.

Consequently, each evaluator can rate the dynamically listed works to thereby generally average their rating frequencies, resulting in generally impartial ratings as a whole even if there exist some evaluators who tend to rate only particular works.

BRIEF DESCRIPTION OF THE DRAWINGS

These and other objects of the invention will be seen by reference to the description, taken in connection with the accompanying drawings, in which:

FIGS. 2(A), 2(B), 2(C), and 2(D) illustrate forms of information stored in various databases;

FIG. 5 is a flowchart describing the basic flow of processing which takes place between the user terminal and a server apparatus;

FIG. 6 is a flowchart describing an operation for displaying screens on the user terminal;

FIG. 7 is a flowchart describing another operation for displaying screens on the user terminal; and FIG. 8 is a flowchart describing an operation which takes place when the user terminal sends the ratings of works.

DETAILED DESCRIPTION OF PREFERRED EMBODIMENTS

This invention will be described in further detail by way of example with reference to the accompanying drawings.

1. First Embodiment

Figure 1:
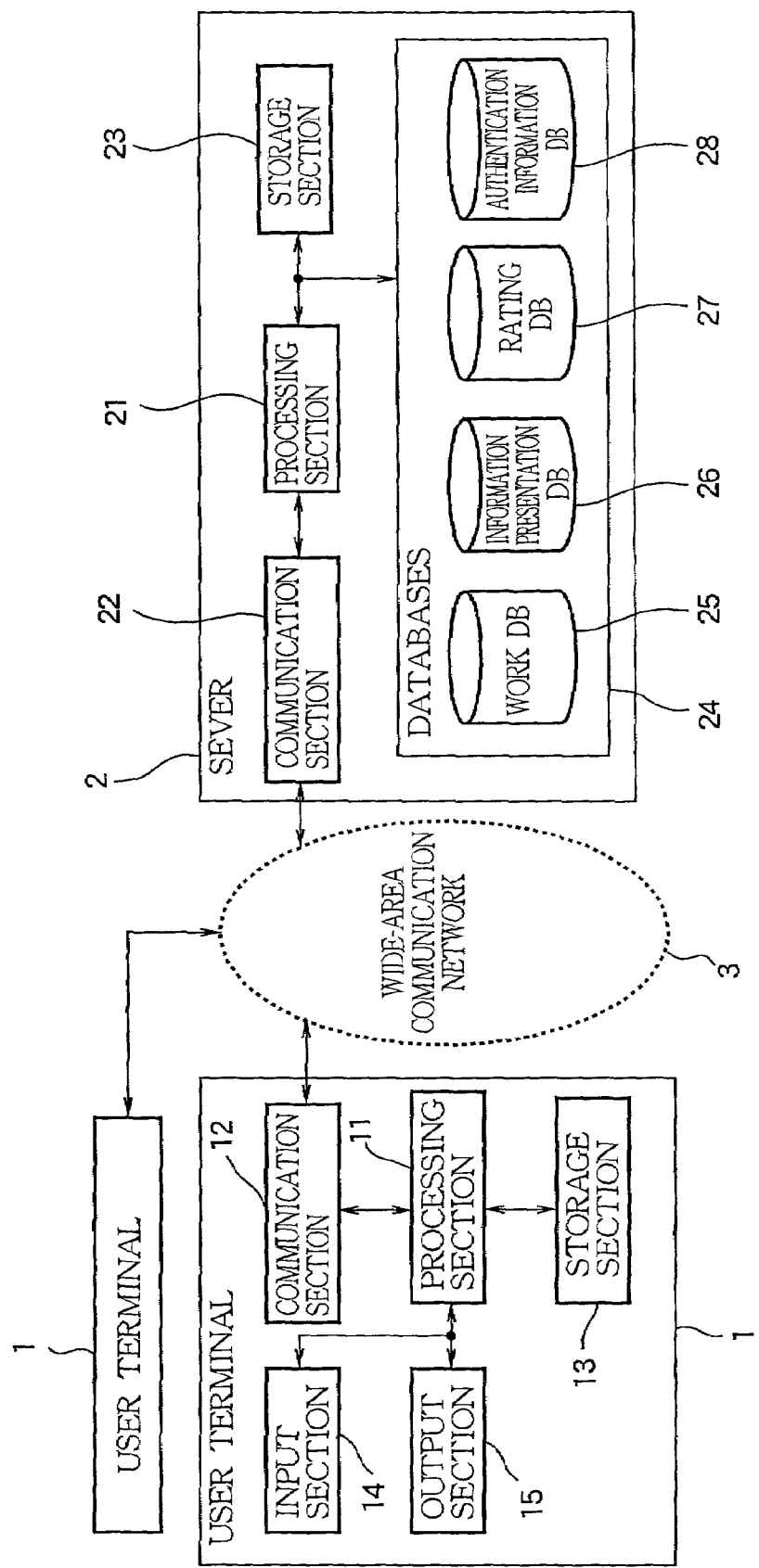
FIG. 1 is a schematic diagram illustrating a network system practiced as one embodiment of the invention.

Now, referring to FIG. 1, an exemplary hardware configuration of a network system practiced as a first embodiment of the invention will be described. As shown, the network system comprises at least two or more user terminals 1, a server 2, and various types of wide-area communication networks 3 capable of two-way data transfer.

1-2 User Terminal 1

The user terminal 1, used by an evaluator who views and evaluates the contents stored in the server 2, comprises a processing section 11, a communication section 12, a storage section 13, an input section 14, and an output section 15.

The communication section 12 transfers various data and messages between the user terminal 1 and the server 2 via the wide-area communication network 3. Actually, the communication section 12 is composed of an interface device (for example, a modem or a LAN card) which is compatible with various communication protocols for data transfer over the wide-area network. The processing section 11 sends and receives various data and messages to and from the wide-area communication network 3 via the communication section 12.

The storage section 13 stores various data and programs and comprises various read-only and readable/writable storage media such as semiconductor memories, magnetic disks, and optical disks, and a drive unit for reading and writing data and programs with these storage media under the control of the processing section 11.

The input section 14 is composed of any of a keyboard, a pointing device such as mouse or tablet, operator controls, and a microphone for example. Through the input section 14, the user, or the evaluator, accesses the server 2 and enters various data and commands to view (reproduce and display) and rate works.

The output section 15 is any of a display device based on CRT or LCD, a printer, and a sounding device such as tone generator or sound system. Referring to the information obtained from the output section 15, the user views a list of works or works themselves.

The processing section 11 controls the overall operation of the user terminal 1. Specifically, the processing section 11 reads and writes various data and programs with the storage section 13 transferred through the communication section 12, executes commands inputted by the user from the input section 14, and controls the output section 13 so as to output audio and video data. The processing section 11 executes these processes as instructed by various programs stored in the storage section 13.

The user terminal 1 constituted by these interconnected sections may be a personal computer or a game machine having communication capabilities, a mobile telephone, a PDA (Personal Digital Assistant), or a stationary telephone set or facsimile machine set. For the convenience of description, it is assumed that the user terminal 1 be a personal computer having at least a keyboard and a pointing device as the input section 14 and a display device, a tone generator, and a sound system as the output section 15, and capable of appropriately decoding and reproducing various data (for example, texts, images, and sounds) received from the server 2.

1-3 Server 2

The server 2 stores works (namely, contents) and information concerning the ratings of the contents and sends the contents of drawing requested by the user terminal 1. The server 2 comprises a processing section 21, a communication section 22, a storage section 23, and a database 24.

The communication section 22 transfers various data and messages between the server 2 and the user terminal 1 via the wide-area communication network 3. Actually, the communication section 22 is composed of interface device (for example, a modem or a LAN card) which is compatible with various communication protocols for data transfer over the wide-area communication network 3. The processing section 21 sends and receives various data and messages to and from the wide-area communication network 3 via the communication section 22.

The storage section 23 stores various data and programs, and comprises various read-only or readable/writable storage media such as semiconductor memories, magnetic disks, and optical disks, and a drive unit for reading and writing data and programs with these storage media under the control of the processing section 21.

The database 24 includes databases 25 through 28 which store data of works (namely, contents), data for presenting information on the user terminal, data of the ratings of the contents, and data of user authentication, respectively. In the execution of contents rating, the processing section 21 appropriately retrieves and updates the data stored in these databases. It should be noted that the database 24 may be practiced as a part of the storage section 23.

The processing section 21 generates data to be sent from the communication section 22 to the user terminal 1, and manages and updates the information stored in the databases 25-28 in accordance with various requests and commands issued by the user terminal 1. The software operating in the processing section 21 compiles and accumulates the rating points for the contents stored in the database 24. This process is performed by various programs stored in the storage section 23 as with the above-mentioned user terminal 1.

For the server 2 in which these sections are organically linked together, it is desired to use a dedicated server machine having a large-scale storage unit and a high-speed CPU. In consideration of the recent high-performance and low-cost CPUs and various information devices, a personal computer based thereon may be used as the server 2. Therefore, the present embodiment will be described without especially restricting the server 2 to a particular computer on the assumption that a WWW (World Wide Web) server program which transfers various data by HTTP (Hyper Text Transfer Protocol) be operating in the server 2.

1-4 Wide-area Communication Network 3

The wide-area communication network 3 may be the Internet, a public switched phone line, or a wireless (satellite) communication line. Any of the communication networks may serve as long as they ensure the data transfer between the user terminal 1 and the server 2. Therefore, the present embodiment will be described without especially restricting the wide-area network 3 to a particular communication means as long as the wide-area communication network 3 is at least capable of transferring various data on an HTTP basis.

2. Rating Processes

The following describes contents rating process executed in a computer network system constituted by the user terminal 1, the server 2, and the wide-area communication network 3. In the user terminal 1, the evaluator reads from the storage section 13 software (a WWW browser) for browsing various information provided by a given WWW server program, starts this software and specifies a predetermined URL (Uniform Resource Locator) to access an artistic work rating site provided by the WWW server program operating on the server 2.

The WWW server program on the server 2 detects the access and requests the accessing user terminal 1 for the user ID and password as necessary.

Then, the server 2 reads the information presentation data stored in corresponding to the accessed URL, or executes a predetermined CGI (Common Gateway Interface) program stored in the storage section 23 to generate the information presentation data, thereby transmitting the information presentation data to the user terminal 1.

Figure 3:
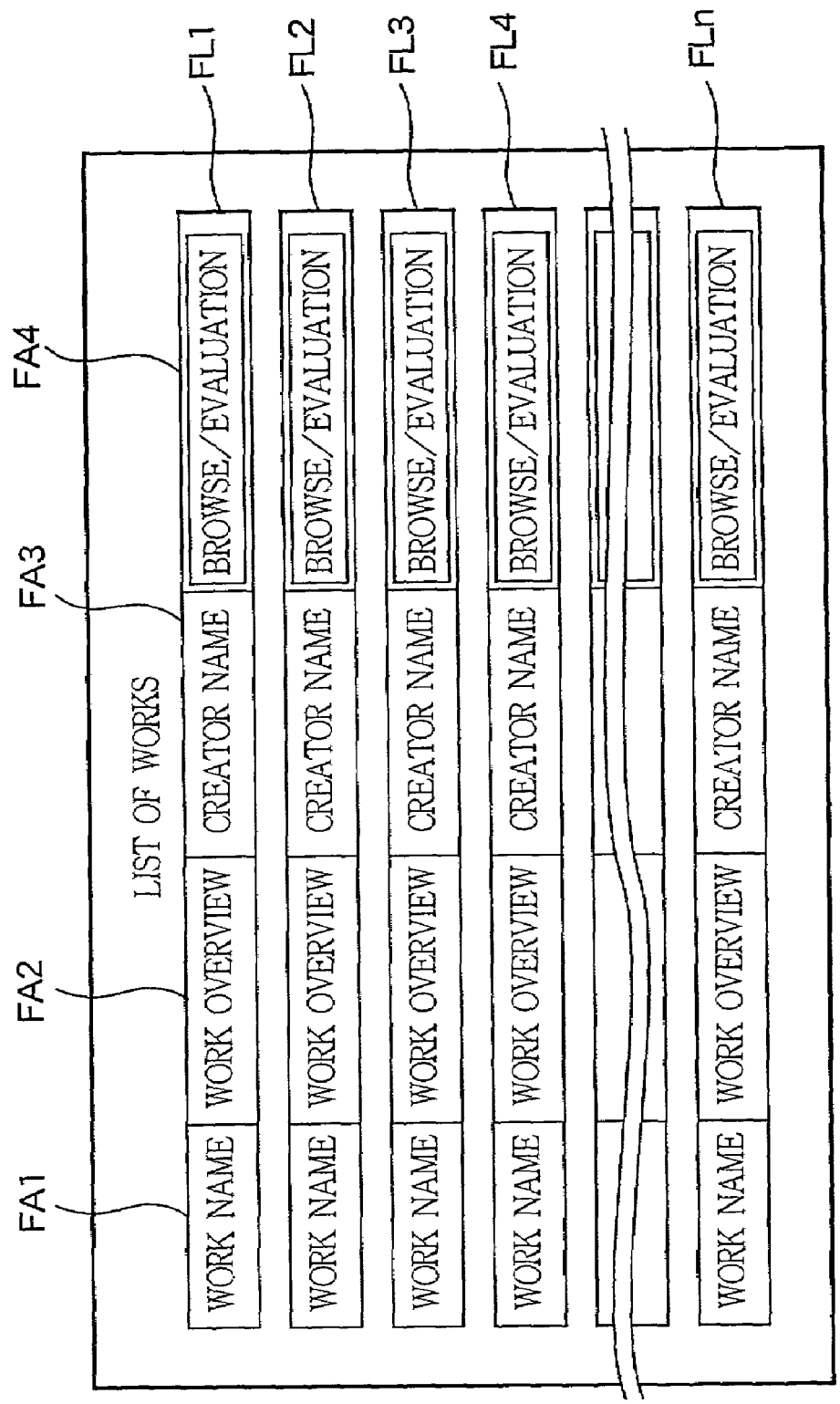
FIG. 3 illustrates an exemplary display screen presented on a user terminal.

The user terminal 1 receives the information presentation data from the server 2, and processes the information presentation data such that a list of works to be rated is displayed in a form shown in FIG. 3 in the WWW browser on the user terminal 1.

This list indicates a plurality of works FL1 through FLn listed sequentially in a predetermined display form, each work being attached with its name FA1, overview FA2, and creator name FA3. Operating a pointing device for example, the evaluator clicks a drawn area labeled "Browse/evaluation" to request the server 2 for the browsing of the corresponding work, thereby browsing the contents of the work in a manner shown in FIG. 4.

Figure 4:
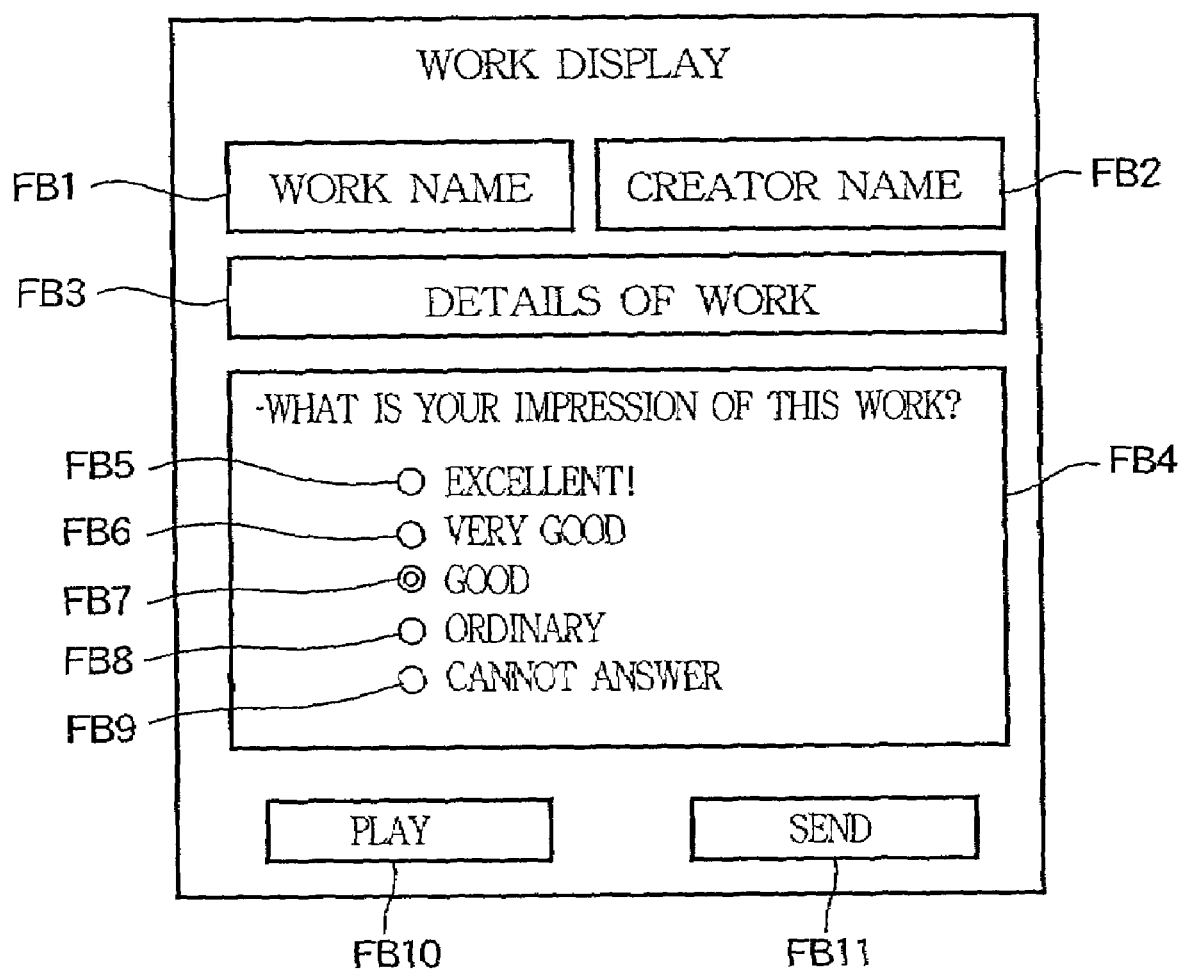
FIG. 4 illustrates an exemplary display screen presented on the user terminal.

The display form shown in FIG. 4 indicates work name FB1, creator name FB2, work description FB3 (in the case of music performances and songs in the present embodiment, FB3 shows lyrics, music scores, or such detail information associated with performance and song as song writer, composer, or adapter), and an evaluation area FB4 composed of rating items and options for evaluating the work. Taking these information into account and clicking a drawn area FB10 labeled "Play," the evaluator can browse (or listen to) the work under rating. The evaluator browses the work under rating, selects one of the rating grades FB5 through FB9 shown in the work rating box FB4 (in FIG. 4, a rating level FB7 "Good" is selected), and clicks a drawn area FB11 labeled "Send" to send the rating result of this work to the server 2.

Repeating the above-mentioned processes, the evaluator sequentially rates the presented works. The server 2 adds the received rating points for each work and stores the total point thereof as a general rating. The following describes a specific technique for practicing the above-mentioned rating processes.

2-1 Contents of Databases

A work database 25 in the server 2 of the present embodiment stores a plurality of works (contents), each being allocated with a unique work ID in a form illustrated in FIG. 2(A) for example. The work database 25 also stores the work data for list display for each work, the work data being for use in presenting to the evaluator at the user terminal 1 the information including a work name FA1, a part of the work, a work overview FA2, and creator name FA3 in the display screen shown in FIG. 3, which is used for displaying a list of works under rating as shown in FIG. 4. It is assumed that the work name, work overview, work details, creator name, or image data of the creator's portrayal be all included in the above-mentioned work data itself or work data for list display.

A work herein includes a piece of music or a music performance based on MIDI data or sound data, an images (a picture) including moving images, text such as poetry and story, or a program (including an applet independent of platform and operating system), and the work is a production of a creator which is evaluateable by others. For the convenience of description, a work herein denotes data associated with details of the work such as music performance, singing, music score and lyrics, and is stored as audio data. The work data for list display denotes text which introduces creator name, image data indicative of the creator's portrayal, and overview of the work.

An information presentation database 26 stores information presentation data associated with the contents to be displayed at the user terminal 1, and related to the display form shown in FIG. 3 or 4. For example, an ID is allocated to the display screen illustrated in FIG. 3 or 4 or to each URL. The presentation data is stored in the form illustrated in FIG. 2(B). The presentation of the information to the user is executed by a service provided by the above-mentioned WWW server program which is operating on the server 2. The information presentation data is constituted by definitions of elements of the information for presentation written in HTML (Hyper Text Markup Language) which allows multiple browsing of information transmission media such as text, image and audio, or SGML (Standard Generalized Markup Language) which is subordinate to HTML or an equivalent language, or constituted by the character string or image arrangement information for defining the elements of the information for presentation.

A rating database 27, related to the work database, stores in a form shown in FIG. 2(D) a number of access times made to each work, the number of evaluating sessions for each work, the total number of rating points obtained by collecting and accumulating the rating points for each work, and the evaluation frequency obtained by dividing the number of evaluating sessions by the total number of evaluating sessions which is a total of the number of evaluating sessions for all works. The rating database 27 also includes a rating master having the rating information about each individual work and the rating information about all works. The rating master stores the total number of the registered works and the total number of evaluating sessions for all works. It should be noted that the rating master need not be always stored in the rating database 27; it may be stored in another location in the server 2 (for example, the storage section 23).

An authentication information database 28 stores in a form shown in FIG. 2(D) the authentication information such as the user IDs for uniquely identifying a plurality of evaluators as necessary and the passwords for authenticating the access to the server 2 by use of these user IDs.

It should be noted that the information associated with the rating of each work stored in the rating database 27 is updated from time to time by the processing of the server 2 to be described later. In the present embodiment, the various data stored in the other databases are read-only. However, these data may be updated if necessary. For example, the works stored in the work database 25 may be subject to update every time new works are registered with this database or the application of new works is made thereto from the public, the registrations or applications being processed sequentially.

2-2 Processing Procedure

The following describes the flows of processes to be executed between the user terminal 1 (or the above-mentioned WWW browser) and the server 2 (or the above-mentioned WWW server program) with reference to FIG. 5. Basically, in the present embodiment, data or messages are transferred interactively between the user terminal 1 and the server 2 as described below.

First, an access request for a predetermined URL is transmitted from the user terminal 1 to the server 2, the predetermined URL being browsable by the WWW server program on the server 2 (step SA1).

Detecting the access from the user terminal 1, the server 2 requests the user terminal 1 for the user ID and password as necessary (step SA2).

Next, the server 2 retrieves the information presentation data specified by the URL or generates information presentation data by use of a predetermined program, thereby transmitting the retrieved or generated data to the user terminal 1 (step SA3). At the same time, the server 2 accesses to the various databases 24 as required (step SA4), retrieving necessary data and updating stored data.

The user terminal 1 draws, reproduces, and displays the received information presentation data (step SA5). The evaluator, the user of the user terminal 1, fills the information input form, gives an instruction to transmit the input information, and transmits the same (step SA6). The server 2 executes predetermined processing by the execution of a CGI program corresponding to the received information (step SA3).

Consequently, the user terminal 1 accesses to the desired URL, and the server 2 executes a process requested by the user terminal 1, thereby transmitting the information presentation data to the user terminal 1. On the basis of the received information presentation data, the user terminal 1 causes the output section 15 to present various information corresponding to the desired URL or the instruction as shown in FIG. 3 or 4. It should be noted that, if the URL requested by the user terminal 1 for access is associated to information presentation data which requires user authentication and this user authentication has been performed in step SA2 in a previous access, it indicates that the requesting user terminal 1 has already been authenticated, so that the server 2 need not perform user authentication and therefore skips to the processing of step SA3 and on.

The following describes the processing to be executed when the user terminal 1 requests the server 2 for accessing to a URL corresponding to the list of works under rating shown in FIG. 3, with reference to FIG. 6.

In order to display the list of works under rating shown in FIG. 3, the user terminal 1 transmits an access request to the server 2 to specify a predetermined URL (step SB1).

Receiving the access request, the server 2 retrieves the work IDs and the rating frequencies together from the rating database 27, and determines the list order of the work IDs such that the lower the evaluation frequency the higher the position in the list ordering of works on display screen (step SB2).

Next, the server 2 retrieves from the information presentation database 26 information to be displayed on the user terminal 1 (for example, the information associated with the display forms of the display areas labeled "Work List" and "Browse/evaluation" shown in FIG. 3 and the information associated with the display arrangement of the various items in the illustrated display screen), and generates the basic information presentation data to be transmitted to the user terminal 1 (step SB3). This basic information presentation data include the full information about the display forms and the display arrangement in the display screen shown in FIG. 3; but, in this basic information presentation data, the word data for list display to be displayed at the location corresponding to each work is not yet defined. The server 2 also retrieves the work IDs and the work data for list display together from the work database 25 (step SB4).

The server 2 arranges (or defines) the work data for list display retrieved in step SB4 into the basic information presentation data prepared in step SB3, and transmits the resultant information presentation data to the user terminal 1 (SB5). It should be noted that the display area FA4 labeled "Browse/evaluation" included in work information FL1 through FLn defines the access request transmission in a linked manner to the work ID for displaying a work display screen in accordance with a predetermined operation (a click for example) by the evaluator.

Then, the user terminal 1 displays the list of works in the order determined above. For example, in FIG. 3, work FL1 has the lowest evaluation frequency. Toward the end of the list, the evaluation frequency increases as FL2, FL3, FL4, . . . , FLn.

Receiving the information presentation data transmitted in step SB5, the user terminal 1 starts the drawing of the list screen showing the works under rating as shown in FIG. 3 (step SB6). When the user terminal 1 has received all the information presentation data from the server 2 and completed the drawing operation, the above-mentioned sequence of processes comes to an end (step SB7).

The following describes the processing to be performed when the user terminal 1 transmits an access request to the server 2 so as to display the work display screen shown in FIG. 4, with reference to FIG. 7.

First, the user terminal 1 transmits an access request to the server 2 so as to display the work display screen shown in FIG. 4 (step SC1). At the same time, the user terminal 1 also transmits the work IDs of works to be displayed (or browsed).

Receiving the access request, the server 2 retrieves from the information presentation database 26 the information to be displayed on the user terminal 1 (for example, the information associated with the display forms of the display areas labeled "Work Display," "Play" and "Send" shown in FIG. 4 and the information associated with the display arrangement of various elements in this illustrated screen or the options FB5 through FB9 in the work rating box), and generates the information presentation data to be transmitted to the user terminal 1 (step SC2). Next, the server 2 transmits the generated information presentation data to the user terminal 1 (step SC3). It should be noted that the display area FB10 labeled "Play" defines the transmission of a request for downloading the work data in accordance with a predetermined operation (a click for example) by the evaluator, and the display area FB11 labeled "Send" defines the transmission of the results of work evaluation selected in the work rating box FB4, each as related to the work ID.

Receiving the information presentation data supplied in step SC3, the user terminal 1 starts the drawing of the work display screen shown in FIG. 4 (step SC4). When the user terminal 1 has received all the information presentation data from the server 2 and completed the drawing operation, the above-mentioned sequence of processes comes to an end (step SC5).

As described, by performing a predetermined operation on the drawn area FB10 labeled "Play" shown in FIG. 4, the evaluator can instruct the server 2 to transmit the work data, which represents a work under rating, and listen to the downloaded audio data in the procedure shown in FIG. 5.

It should be noted that the individual work data or the work data for list display stored in the work database 25 are the products of their creators and include portrayals. Therefore, in order to prevent these data from unauthorized duplication, modification, and distribution or exposure to such activities, it is desirable to embed electronic watermark in these data or encrypt them in a predetermined manner before transmitting to the user terminal 1.

Especially, it is desirable that audio and video data be reproduced in a stream reproduction manner where the data is successively reproduced while it is received, and the reproduced data be deleted upon reproduction from the user terminal 1.

The following describes the processing of transmitting work evaluation results from the user terminal 1 to the server 2 with reference to FIG. 8. The evaluator selects one of the options FB5 through FB9 in the work rating area shown in the work display screen shown in FIG. 4 in accordance with the evaluator's impression of the work which he has browsed, and performs a predetermined operation on the display area FB11 labeled "Send," upon which the selection and its work ID are transmitted to the server 2 (step SD1). As described, because the work ID had already been transmitted to the server 2 when an access request for the work display screen shown in FIG. 4 was made, the transmission of the work ID in step SD1 may be omitted.

Receiving the work evaluation results, the server 2 adds the received rating to the total rating corresponding to the received work ID among the rating information stored in the rating database 27 (step SD2). The rating points assigned to the options shown in the work rating area FB4 of FIG. 4 are "Excellent!"=4, "Very Good"=3, "Good"=2, "Ordinary"=1, and "Cannot Answer"=0 for example. The selected one of these points is added to the total rating points in step SD2.

Next, the server 2 updates (adds 1 to) the evaluation frequency in the rating information corresponding to the work in question stored in the rating database (step SD3). Namely, the server 2 updates (adds 1 to) the total evaluation session count, which is the total number of evaluation sessions for all works in the rating master (step SD4). The server 2 updates the evaluation frequency in the rating information of each work by dividing the number of evaluation sessions associated with each work by the total evaluation session count updated in step SD4 (step SD5).

It should be noted that, in the present embodiment, the updating of the evaluation frequency or the list ordering of works to be stored in the rating database 27 may be performed at any timing. For example, the list ordering of works may be performed after the rating of a work (namely, at completion of the processing such as the transmission and registration of work rating in step SD6 shown in FIG. 8). Alternatively, the number of evaluation sessions performed for each work may be totaled at a predetermined time interval defined by a timer section (not shown) installed on the server 2, for example, every week, and on the basis of the obtained result, updating of the evaluation frequency of each work or the determination of the list ordering of works may be performed. Alternatively still, as the total evaluation session count stored in the rating master is updated (or added) by a predetermined amount, the updating of the evaluation frequency of each work and the determination of the list ordering of works may be performed.

According to the above-described first embodiment, on the basis of the frequency of rating for each of a plurality of works, the list ordering of works by which each work is presented to evaluators is determined, and the artistic works are presented in the determined list ordering, so that each evaluator is prompted to preferentially rate those works which have lower evaluation frequencies, thereby evaluating each of the plurality of contents under rating with a generally uniform evaluation session count or frequency. Consequently, even if there exist evaluators who tend to rate only a part of all works under rating, the present invention causes all the works under rating to be finally rated without deflection, thereby providing impartial and even rating for each work.

3. Second Embodiment

A second embodiment of the present invention is associated with an improvement on a contents rating process and, more particularly, to an improvement on a technique for presenting works under rating to evaluators.

If the number of works to be rated at the same time is great in the first embodiment of the contents rating method, evaluation of the works may take much labor and time and may increase the processing load of the user terminal 1 in accessing the server 2 and completing the presentation of these works and the processing load of the server 2 in determining the list ordering of works in step SB2 shown in FIG. 6 for example, thereby hindering the smooth rating of works.

To overcome such a problem, the second embodiment presents only one work or only a part of works under rating to each evaluator. The second embodiment is generally the same as the first embodiment in hardware configuration and main processing; therefore only the differences will be described below.

In the first embodiment, the screen for listing the works under rating shown in FIG. 3 is displayed first and the rating is performed in the work display screen shown in FIG. 4. In the second embodiment, however, step SB2 shown in FIG. 6 only extracts the work ID having the lowest evaluation frequency, steps SB3 through SB7 shown in FIG. 6 are omitted, and the processing on this work ID in steps SC2 and on shown in FIG. 7 is executed after step SB2. Consequently, each evaluator is presented with only one work under rating in the form shown in FIG. 3 for example.

The number of works to be presented may be optimized so each evaluator can easily recognize the number of works under rating or the overview of each work under rating.

For example, among a plurality of works under rating, the number of works having lower evaluation frequencies are selected at a predetermined time interval such as one week for example, and the selected works are presented in the same manner as the first embodiment or only one work is presented. Alternatively, the works under rating may be simply selected at random at a predetermined time interval or in accordance with a predetermined sequence (for example, the sequence of acceptance).

In this case, those works which have been evaluated frequently more than a certain number of times may be regarded as completed in rating and be excluded from the works to be presented; conversely, those works which have lower evaluation session counts or lower evaluation frequencies may be preferentially presented again.

To be more specific, the databases 24 may include a work-under-rating database for storing only the selected works for actual rating and a rated work database for storing only the rating information about the rated works to perform the above-mentioned reading and processing of various data on these additional databases, then reflect the contents of the work-under-rating database onto the rating database 27 at a predetermined time interval such as one week, and, on the basis of the resultant contents of the rating database 27, select the work IDs to be presented for evaluation next and update the work-under-rating database.

Alternatively, the presentation of works under rating and the updating of evaluation frequency information described in each of the above-mentioned embodiments may be restricted by the software stored in the storage section 23 of the server 2 only to selected works.

As described, the above-mentioned second embodiment saves as much as possible for each evaluator the labor and time for identifying and determining the works to be rated from among a list of works under rating, thereby allowing each evaluator to efficiently evaluate each work, to intensively evaluate the limited number of works with closer attention, and to impartially evaluate each work.

As described, the second embodiment reduces the number of works to be rated at a time to mitigate the load of rating activities by each evaluator and the load of the processing in the user terminal 1 as well as the server 2, thereby realizing an efficient contents rating process as a whole.

4. Third Embodiment

A third embodiment of the present invention is associated with an improvement on a the contents rating process and, more particularly, to an improvement on a technique for rating each work.

In the contents rating method, the server 2 does not recognize any evaluation of works unless the evaluators explicitly notify the sever 2 of the evaluation results.

The third embodiment is adapted to also count the browsing alone as an activity of evaluation. The third embodiment is generally the same as the first embodiment in hardware configuration and main processing; therefore only the differences will be described below.

In the third embodiment, the procedure branches from step SC3 to SC 6 as shown in FIG. 7. As shown in steps SC6 through SC8, only the browsing of a work under rating (for example, the reproduction of audio data executed in response to a predetermined operation performed on the display area labeled "Play" in FIG. 4 in the first and second embodiments) or only the requesting for the browsing of a work under rating (the access request for the work display screen shown in FIG. 4 in the first and second embodiments) is counted to add a rating point to some degree. In step SC6, a predetermined value (for example, 0.1) is added to the evaluation frequency of the browsed work and the total evaluation session count in the rating master. In step SC7, the evaluation frequencies of all works are updated. In step SC8, a predetermined rating point (for example, 0.1) is added to the total rating point of the browsed work.

Thus, an activity of simple browsing by evaluators who are just interested in particular works can be reflected onto the score of each work.

The rating method in the third embodiment may also be effectively used when a particular user (namely, an evaluator in the first and second embodiments) performs detail evaluation of works, and the results of the rating are browsable by others, namely the rating-associated information is presented in different manners between registered users and general users.

For general users, a list of works under rating is presented in an existing technique or the above-mentioned technique of the first embodiment. Each general user browses only the works of interest from the presented list. In response to this browsing, the processes of steps SC6 through SC8 shown in FIG. 7 are executed, attaching some weight to the browsing by general users and adding the result to the evaluation frequency and total rating of each work. Consequently, the third embodiment provides an additional advantage of also taking into account the latent rating of works by those general users who are not especially aware of the rating.

5. Variations

It will be apparent to those skilled in the art that the determination of the list ordering of works in step SB2 shown in FIG. 6 may be executed by any other techniques as far as they provide the generally uniform evaluation frequency on the basis of the past evaluation frequency of each work (namely, those techniques which average the number of ratings for all works under rating). For example, the list ordering of works in step SB2 shown in FIG. 6 may be determined by use of random numbers. In this determination based on random numbers, the works under rating are presented in the top portion of the list on average or as a special group under rating, so that this variation also provides generally the same effects as the above-mentioned embodiments.

With the above-mentioned embodiments, in the initial state where the contents rating just starts, the evaluation session counts and frequencies of the works under rating are the same and, unless some rating is performed, the above-mentioned embodiments may not function effectively. To overcome this problem, the list ordering may be determined by use of random numbers until the number of evaluation sessions is counted to some degree, subsequently determining the list ordering on the basis of the obtained evaluation frequency.

In order to make the rating of each work more impartial, the total rating point of each work may be divided by the number of ratings for each work, thereby normalizing the rating point of each work.

In order to prevent each evaluator from incidentally rating the same work in a duplicate manner or intentionally rating the same work two or more times (namely, padding out the rating), the server 2 may be adapted to identify each evaluator and present only the works which have not been rated by the evaluator concerned. Each evaluator may be identified by the user authentication of step SA2 shown in FIG. 5 or the address of each evaluator on the network to which the user terminal 1 is connected (for example, IP address or telephone number). These measures can prevent the intentional or unintentional padding out of rating points.

In the above description, the amount obtained by adding rating points by evaluators is used as a total rating point. The total rating point may be obtained otherwise by subtracting the rating points by evaluators from a predetermined total rating point.

If two or more work IDs having the same evaluation frequency are extracted in the above-mentioned embodiments, these work IDs may be further ordered by a predetermined sequence (for example, a sequence of IDs, work names, or creator names, or a random sequence).

In the above-mentioned embodiments, the work data itself is browsed only when a predetermined operation is performed on the display area FB10 in the work display screen illustrated in FIG. 4 which is displayed when the processing described with reference to FIG. 6 is executed. It is also practicable to automatically start the browsing as the display screen shown in FIG. 4 is displayed (for example, in the case of MIDI data, audio data, and moving image data, automatically reproducing these data; in the case of still image and text, previously arranging these data in a predetermined area of the work display screen shown in FIG. 4, or in the case of a program executable on the user terminal 1, automatically executing it).

In this variation, the process of step SC2 shown in FIG. 7 is replaced by the process of step SB3 shown in FIG. 6, and the processes as same as steps SB4 and SB5 shown in FIG. 6 are executed before executing the process of step SC3. First, in step SC2, the basic presentation data in accordance with the presentation form of work data (for example, the above-mentioned displaying of images or automatic reproduction of audio data) is prepared, like step SB3 shown in FIG. 6. Next, like step SB4, the work data and so on of works requested for presentation are read out from the work database 25 to be arranged in the basic presentation data prepared above. In step SC4, the resultant information presentation data is transmitted to the user terminal 1.

In the above-mentioned embodiments, the rating is executed on works themselves. It is also practicable to register a plurality of works for each creator with the work database 25, and to rate the creators on the basis of the total rating for these works. This variation allows not only the rating of individual works but also the rating of the creators of these works as with band auditions.

The work rating area FB4 shown in FIG. 5 has only one evaluation item. It is also practicable to further classify the contents of evaluation to let each evaluator to perform rating in accordance with the multiple items. For example, in the case of music constituted by both instrument play and vocal singing, the rating may be divided into lyrics, melody, arrangement, play performance, singing performance, originality, visual effects, and so on. Alternatively, the work rating area FB4 may have a box in which each evaluator can enter a comment (specific advice for example) in text which supplement the evaluation items presented by the server 2. Thus, in addition to the statistical points, evaluator's comments can be taken into consideration in rating works, thereby feeding more detailed ratings back to their creators.

In displaying the display screens shown in FIGS. 3 and 4 onto the user terminal 1, the arrangement of the display elements may be changed as required. If a sound system is used as the output section 15, the presentation, browsing, and instruction for rating of works may be supplied from the server 2 to the user terminal 1 in the form of audio data synthesized at the server 2 or, on the basis of the phoneme data supplied from the server 2 at the server 2, whereby the synthesized audio data can be sounded by this sound system.

The present invention has been described by use of the preferred embodiments and their variations for example. It will be apparent to those skilled in the art that the present invention is not limited to these embodiments and variations. Various changes and modifications may be made to these embodiments and variations. For example, as far as the information presentation data in step SB5 or SC3 can be obtained, the processing preceding these steps and its procedural sequence may be changed as required in the processing by the server 2 described with reference to FIG. 7. Likewise, the other processing by the server 2 described with reference to FIGS. 5 and 8 may be changed as required.

In the above-mentioned embodiments, the user terminal 1 is described only as a personal computer. It will be apparent to those skilled in the art that the user terminal 1 may be a game machine, a mobile information terminal set like a mobile phone or PDA, a stationery phone or facsimile machine, or a combination thereof. In the case of the combination, the server 2 may execute server programs corresponding to the terminal devices in the combination as required. Also, the server 2 may provide work presentation forms, browsing forms, or rating items suitable for respective terminal devices in the combination.

In the above-mentioned embodiments and variations, there are two or more user terminals 1. However, there may be only one user terminal 1 if it is configured as a kiosk-type terminal installed at stores.

The present invention is characterized mainly by the technique of presenting works to their evaluators. The work presenting form is not restricted to the above-mentioned embodiments; namely, the works under rating may be presented in the form of voice guide or print like facsimile for example.

The above-described invention is practiced as a method of executing the above-mentioned contents rating, a server or a terminal device for executing the above-mentioned contents rating, a system constituted by a server apparatus and a terminal device for executing the above-mentioned contents rating, or a software program carried by a recording medium or a transmission medium which operates on a server or a terminal device for executing the above-mentioned contents rating.

As described and according to the invention, the presentation order of a plurality of works under rating in a list is determined on the basis of the frequency of evaluating sessions for each work or on the basis of random numbers, so that all the works are rated evenly with generally the same evaluation frequency. Consequently, even if some evaluators attempt to rate only particular works, they are eventually rated without deflection, thereby realizing the impartial rating for all works.

While the preferred embodiments of the present invention have been described using specific terms, such description is for illustrative purposes only, and it is to be understood that changes and variations may be made without departing from the spirit or scope of the appended claims.

What is claimed is:

1. A method of evaluating contents provided in the form of a plurality of works from a server apparatus having a storage unit that stores a frequency of evaluation for each work obtained by dividing a number of evaluations counted for each work by a total number of evaluations counted for the plurality of works, and a communication unit that communicates with a terminal apparatus where the evaluation of works is conducted, the method, performed by the server apparatus, comprising the steps of:

receiving a request for a list of works to be evaluated from the terminal apparatus;

determining an order of the works in the list by use of random numbers, thereby randomizing the order of the works, until the number of evaluations counted for the works in the list reaches a given number;

determining the order of the works in the list according to the frequency of evaluation for each work such that the lower the frequency of evaluation the higher the position in the list, after the number of evaluations counted for the works in the list exceeds the given number;

transmitting the list of the works arranged in a determined order to the terminal apparatus, thereby prompting the evaluation of the works in the list; and receiving a result of the evaluation from the terminal apparatus and updating the frequency of evaluation for each work according to the result of the evaluation.

2. The method according to claim 1, wherein one of the steps of determining the order of the works is carried out when a request for the list of the works is received by the server apparatus.

3. The method according to claim 1, wherein one of the steps of determining the order of the works is carried out after an evaluation is received by the server apparatus.

4. The method according to claim 1, further comprising the step of counting a predetermined period by means of a timer provided in the server apparatus, so that one of the steps of determining the order of the works is carried out each time the predetermined period is counted.

5. The method according to claim 1, further comprising the step of providing the contents in the from of works selected from a group consisting of music works, graphic art works, movie works, literary works and computer program works.

6. The method according to claim 1, wherein the evaluation from the terminal apparatus comprises a manual evaluation by a user of all the works in the list.

7. A server apparatus for evaluating contents provided in the form of a plurality of works, comprising;
- a storage unit that stores a frequency of evaluation for each work obtained by dividing a number of evaluations counted for each work by a total number of evaluations counted for the plurality of works;
- a communication unit that communicates with a terminal apparatus where the evaluation of works is conducted; and
- a processor unit that conducts a method comprising the steps of:
- receiving a request for a list of works to be evaluated from the terminal apparatus;
- determining an order of the works in the list by use of random numbers, thereby randomizing the order of the works, until the number of evaluations counted for the works in the list reaches a given number;
- determining the order of the works in the list according to the frequency of evaluation for each work such that the lower the frequency of evaluation the higher the position in the list, after the number of evaluations counted fro the works in the list exceeds the given number;
- transmitting the list of the works arranged in a determined order to the terminal apparatus, thereby prompting the evaluation of the works in the list; and
- receiving a result of the evaluation from the terminal apparatus and updating the frequency of evaluation for each work according to the result of the evaluation.

8. A machine readable storage device for use in a server apparatus having a processor unit for evaluating contents provided in the form of a plurality of works, a storage unit for storing a frequency of evaluation for each work obtained by dividing a number of evaluations counted for each work by a total number of evaluations counted for the plurality of works, and a communication unit for communicating with a terminal apparatus where the evaluation of works is conducted, the storage device containing program instructions executable by the processor unit for causing the server apparatus to perform the method comprising the steps of:
- receiving a request for a list of works to be evaluated from the terminal apparatus;
- determining an order of the works in the list by use of random numbers, thereby randomizing the order of the works, until the number of evaluations counted for the works in the list reaches a given number;
- determining the order of the works in the list according to the frequency of evaluation for each work such that the lower the frequency of evaluation the higher the position in the list, after the number of evaluations counted fro the works in the list exceeds the given number;
- transmitting the list of the works arranged in a determined order to the terminal apparatus, thereby prompting the evaluation of the works in the list; and
- receiving a result of the evaluation from the terminal apparatus and updating the frequency of evaluation for each work according to the result of the evaluation.

* * * * *